US012746973B2

(12) United States Patent
Itai

(10) Patent No.: US 12,746,973 B2
(45) Date of Patent: Sep. 29, 2026

(54) VEHICLE FLOOR STRUCTURE

(71) Applicant: TOYOTA JIDOSHA KABUSHIKI KAISHA, Aichi-ken (JP)

(72) Inventor: Nobuyuki Itai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 349 days.

(21) Appl. No.: 18/544,435

(22) Filed: Dec. 19, 2023

(65) Prior Publication Data

US 2024/0208577 A1 Jun. 27, 2024

(30) Foreign Application Priority Data

Dec. 26, 2022 (JP) ................................ 2022-208306

(51) Int. Cl.

| | |
|---|---|
| ***B62D 21/15*** | (2006.01) |
| ***B62D 25/20*** | (2006.01) |
| ***B62D 27/06*** | (2006.01) |
| ***B62D 29/00*** | (2006.01) |

(52) U.S. Cl.

CPC ........... *B62D 21/157* (2013.01); *B62D 25/20* (2013.01); *B62D 27/065* (2013.01); *B62D 29/008* (2013.01)

(58) Field of Classification Search

CPC .... B62D 25/20; B62D 21/157; B62D 27/065; B62D 29/008

See application file for complete search history.

(56) References Cited

U.S. PATENT DOCUMENTS

| | | | | |
|---|---|---|---|---|
| 11,008,048 B2 * | 5/2021 | Natsume | ............ | B62D 25/2009 |
| 2007/0284914 A1 | 12/2007 | Schiebel et al. | | |
| 2008/0231078 A1 * | 9/2008 | Tomozawa | ......... | B62D 25/2036 296/187.05 |
| 2019/0359046 A1 | 11/2019 | Tsuyuzaki et al. | | |
| 2020/0180698 A1 * | 6/2020 | Lee | ........................ | B62D 21/03 |

FOREIGN PATENT DOCUMENTS

| | | | | |
|---|---|---|---|---|
| DE | 102014018399 A1 * | 6/2015 | ......... | B60R 13/0815 |
| JP | 2000168627 A | 6/2000 | | |
| JP | 2019-202744 A | 11/2019 | | |
| WO | WO-2013108383 A1 * | 7/2013 | ......... | B62D 25/2036 |

* cited by examiner

*Primary Examiner* — Robert E Fuller
(74) *Attorney, Agent, or Firm* — HAUPTMAN HAM, LLP

(57) ABSTRACT

A floor cross member is joined to an upper surface of a floor panel so as to traverse a raised tunnel portion of the floor panel. The floor cross member is composed of a cross member center component formed of an aluminum alloy cast and cross member side components formed of steel plates and arranged on left and right sides of the cross member center component, respectively. A recess is formed in an undersurface of the cross member center component to evade the tunnel portion. Upper plates of the left and right cross member side components are placed at the same height position as a base plate of the cross member center component, and an end of each of the upper plates of the left and right cross member side components contacts with a contact surface of the base plate of the cross member center component.

4 Claims, 3 Drawing Sheets

VEHICLE FLOOR STRUCTURE

CROSS REFERENCE TO RELATED APPLICATION

This application claims priority to Japanese Patent Application No. 2022-208306 filed on Dec. 26, 2022, which is incorporated herein by reference in its entirety including the specification, claims, drawings, and abstract.

TECHNICAL FIELD

The present disclosure relates to a floor structure of a vehicle, and, in particular, to a structure of a floor cross member constituting a part of a frame structure of a vehicle body.

BACKGROUND

As a floor structure of a vehicle body, there has been known a structure including a pair of rockers respectively extending on left and right side edges of the vehicle body along the longitudinal direction of a vehicle, and a cross structure whose ends are connected to the left and right rockers, the cross structure having a closed structure in cross section. The cross structure is composed of a floor panel and a floor cross member having a top hat cross sectional shape extending along the lateral direction, the floor cross member being joined to the floor panel. The floor panel has a raised tunnel portion extending along the longitudinal direction at the center, in the lateral direction, of a floor, and the floor cross member is designed to traverse the tunnel portion.

JP 2019-202744 A1 describes a floor cross member (35) disposed on a floor panel (16) having a tunnel portion (floor tunnel 66). The floor cross member (35) has a central portion, which traverses the tunnel portion (66), and left and right side portions respectively joined to left and right ends of the central portion. Specifically, the floor cross member (35) includes an on-tunnel reinforcement member (76) and a bottom reinforcement member (72) disposed above and below the tunnel portion (66) of the floor panel (16), and further includes a left cross member portion (37) and a right cross member portion (38) which are respectively joined to left and right ends of the reinforcement members. A vehicle (10) disclosed in JP 2019-202744 A1 has a battery pack (28) mounted below a floor of the vehicle (10). It should be noted that the component names and reference numerals described in parentheses designate components of JP 2019-202744 A1, and are not related to any component names or reference numerals used to explain embodiments of this application.

The floor cross member configured to traverse the raised tunnel portion is provided with a recess corresponding to the tunnel portion in an undersurface of the floor cross member, to avoid interference with the tunnel portion. For this reason, the floor cross member is decreased in strength in a region where the floor cross member traverses the tunnel portion. In particular, for electrically driven vehicles including a battery pack mounted below the floor, it is desired that the floor cross member have a sufficient strength for protecting the battery pack against a collision impact load exerted at the occurrence of a side collision.

SUMMARY

The present disclosure provides a floor structure of a vehicle in which the strength of a floor cross member is enhanced.

A vehicle floor structure according to the present disclosure includes a floor panel, which has a raised tunnel portion extending along the longitudinal direction of a vehicle, and a floor cross member, which extends along the lateral direction of the vehicle so as to traverse the tunnel portion, and is joined at both ends to left and right rockers extending along the left and right edges of the floor panel and further joined to an upper surface of the floor panel. The floor cross member includes both a cross member center component which is composed of an aluminum alloy cast with a recess being formed in an undersurface so as to avoid interference with the tunnel portion in a region where the cross member center component traverses the tunnel portion, and left and right cross member side components, each of which is composed of a steel plate and is joined to a corresponding one of left and right ends of the cross member center component at a position located outside the tunnel portion in the lateral direction. The cross member center component has a base plate disposed at the same height as an upper plate of each of the left and right cross member side components, the upper plate extending straight along the lateral direction. An end of the upper plate of each of the left and right cross member side components abuts against a corresponding one of contact surfaces disposed at both lateral ends of the base plate.

Because the base plate of the cross member center component and the upper plate of the cross member side component cooperatively form a straight surface extending linearly between the left and right rockers, a lateral collision load exerted on one of the rockers can be effectively transferred to the other of the rockers through the straight surface. This can suppress deformation of the one of the rockers that has initially received the lateral collision load.

Each of the cross member side components may have a top hat cross sectional shape, and the cross member center component may have, in left and right end regions thereof, a top hat cross sectional shape which overlaps with the top hat cross sectional shape of the cross member side component when the floor cross member is viewed from outside along the lateral direction. In this way, the lateral collision load can be transferred from the entire end surface of one of the cross member side components to the cross member center component, and through the cross member center component to the entire end surface of the other of the cross member side components.

The cross member center component may include, on its undersurface, a plurality of lower ribs extending in a region facing a side wall of the tunnel portion so as to intersect the longitudinal direction of the vehicle. The lower ribs can reinforce the floor cross member in a region where the cross sectional shape of the floor cross member changes.

In the above-described vehicle floor structure, the cross member center component may include, on its upper surface, a plurality of upper ribs extending so as to intersect the longitudinal direction of the vehicle. The upper ribs can enhance the strength of the floor cross member center component, and, in particular, enhance the strength against a bending load exerted along the lateral direction.

In the above-described vehicle floor structure, the cross member center component may have an overlapping portion which extends from the contact surface toward the lateral outside portion and is designed to be overlaid on a part of the cross member side component, and the overlapping portion, the cross member side component, and a leg of a seat may be fastened to each other by a bolt. In this way, attachment rigidity of the seat can be improved.

BRIEF DESCRIPTION OF DRAWINGS

Embodiments of the present disclosure will be described based on the following figures, wherein.

DESCRIPTION OF EMBODIMENTS

Hereinafter, an embodiment according to the present disclosure will be explained with reference to the drawings. In the description below, unless otherwise specified, terms representing relative positions, directions, and orientations, such as front, forward, rear, rearward, left, leftward, right, rightward, top, upper, bottom, and lower, denote relative positions, directions, and orientations with respect to a vehicle. In addition, the front to rear direction of a vehicle is referred to as a longitudinal direction, a left to right direction of the vehicle as a lateral direction, and a top to bottom direction as a vertical direction.

Figure 1:
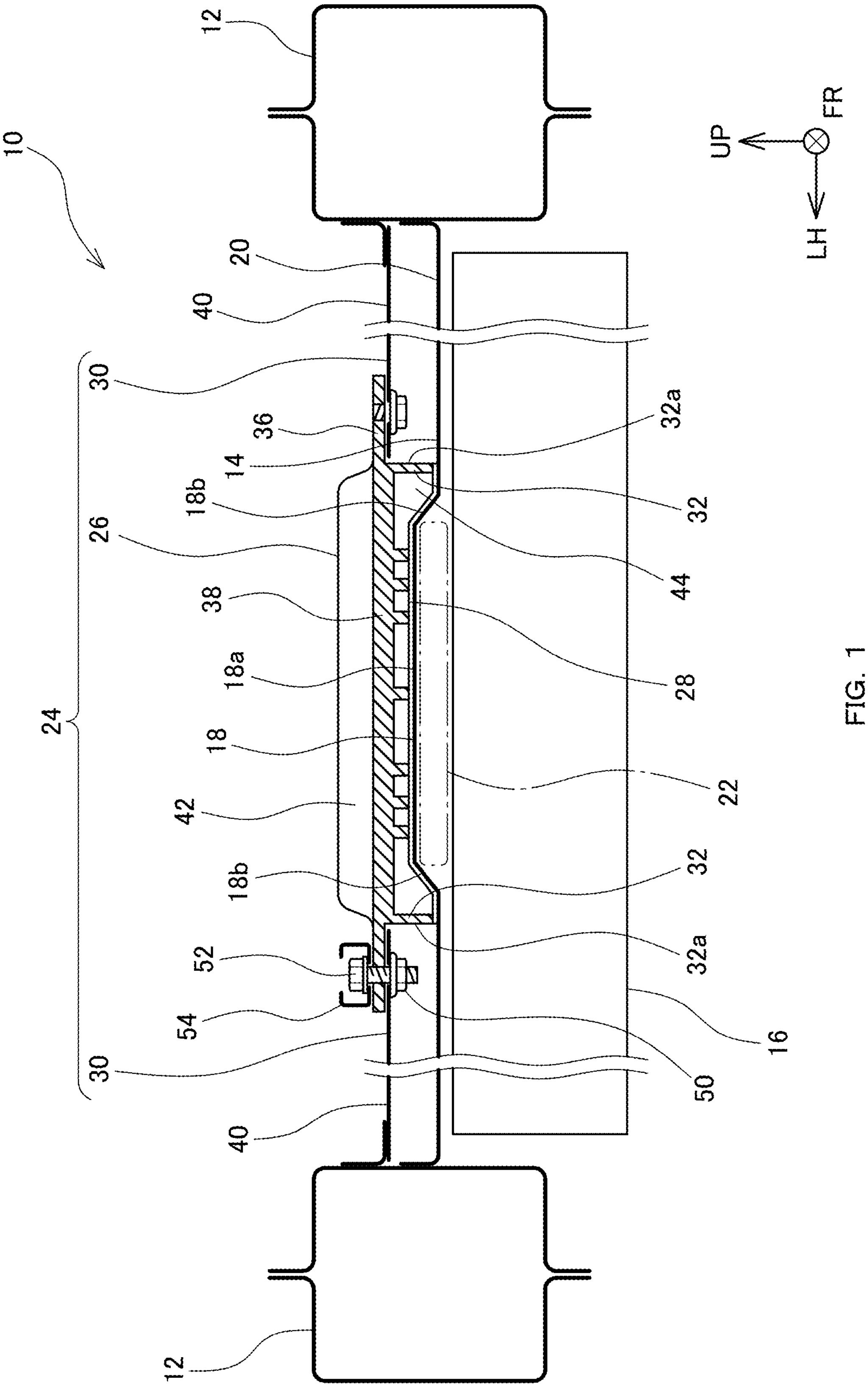
FIG. 1 shows a schematic cross sectional view of a floor of a vehicle taken along a direction perpendicular to the longitudinal direction of the vehicle.

FIG. 1 is a cross sectional view of a floor 10 of an electrically driven vehicle. A rocker 12 extending along the longitudinal direction is disposed on each of left and right sides of the floor 10. The rocker 12 has a closed structure in cross section, and constitutes a part of a frame structure of the vehicle. A floor panel 14 is disposed between the left and right rockers 12, and left and right edges of the floor panel 14 are joined to the left and right rockers 12, respectively by means of a welding technique, for example. A motor for driving the vehicle is supplied with electricity from a battery cell housed in a battery pack 16, and the battery pack 16 is mounted below the floor panel 14. The floor panel 14 includes a tunnel portion 18 extending along the longitudinal direction at the center in the lateral direction of the floor panel 14. The tunnel portion 18 is raised upward from a main surface 20 of the floor panel 14 to create a wiring and piping space 22 for storing wires and pipes between the tunnel portion 18 and the battery pack 16. The wiring and piping space 22 may have a substantially trapezoidal shape in cross section. The tunnel portion 18 has a horizontally placed ceiling 18*a* and inclined side walls 18*b* disposed on left and right ends of the ceiling 18*a*. It should be noted that the trapezoidal shape denotes a quadrilateral with a pair of opposite sides being parallel to each other.

A floor cross member 24 is joined to the floor panel 14 on its upper side. The floor cross member 24 has a top hat cross sectional shape and cooperates with the floor panel 14 to form a frame member of a vehicle body, the frame member having a closed cross section and extending along the lateral direction. The top hat cross sectional shape has three consecutive sides of a quadrilateral and two flanges extending toward mutually opposite directions from both ends of the three consecutive sides. The floor cross member 24 is separated into three parts consisting of a center part and left and right side parts. A cross member center component 26 constituting the center part is placed above the tunnel portion 18 so as to traverse the tunnel portion 18 and has a length greater than a width (a lateral dimension) of the tunnel portion 18. A recess 28 is formed in the undersurface of the cross member center component 26 so as to avoid interference with the tunnel portion 18 which is raised upward. The cross member center component 26 may be formed of an aluminum alloy cast and may be manufactured with a casting method, such as metal mold casting, die casting, or squeeze casting, for example.

Cross member side components 30 are respectively disposed on the left and right sides of the cross member center component 26, and one end of each of the cross member side components 30 is joined to a corresponding end of the cross member center component 26 by a welding or bonding technique, for example. The cross member side component 30 may be composed of a steel plate, and, in particular, a high tensile steel plate formed in a top hat shape in cross section. The cross member side component 30 is also joined to the floor panel 14 via a lower flange of the top hat shape by a welding technique or the like. In addition, the other end of each of the cross member side components 30 is joined to the rocker 12 by the welding technique or the like.

Figure 2:
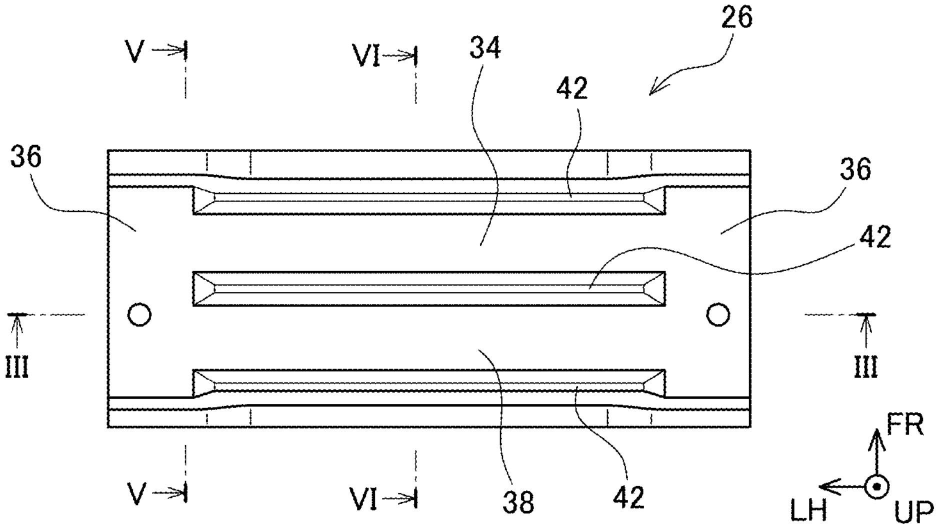
FIG. 2 shows a schematic plan view of a cross member center component.
Figure 3:
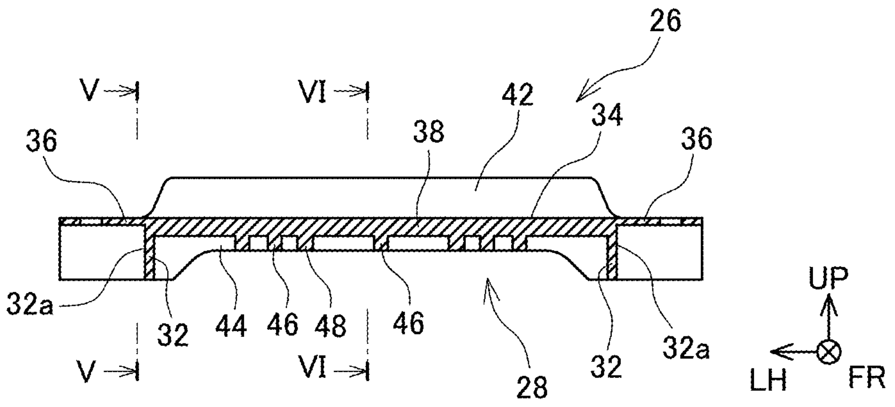
FIG. 3 shows a schematic cross sectional view of the cross member center component taken along line I-I indicated in FIG. 2.
Figure 4:
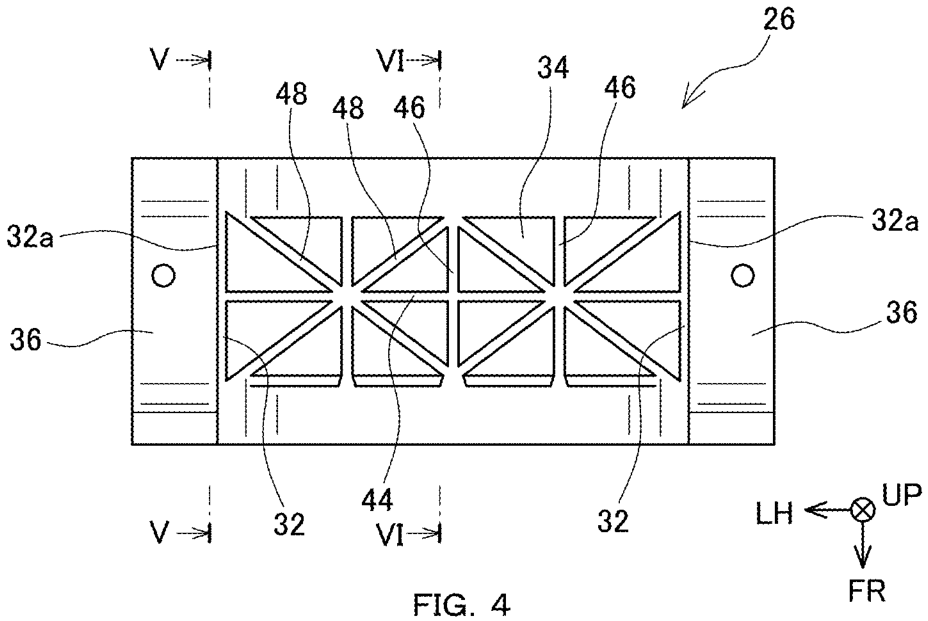
FIG. 4 shows a schematic bottom view of the cross member center component.
Figure 5:
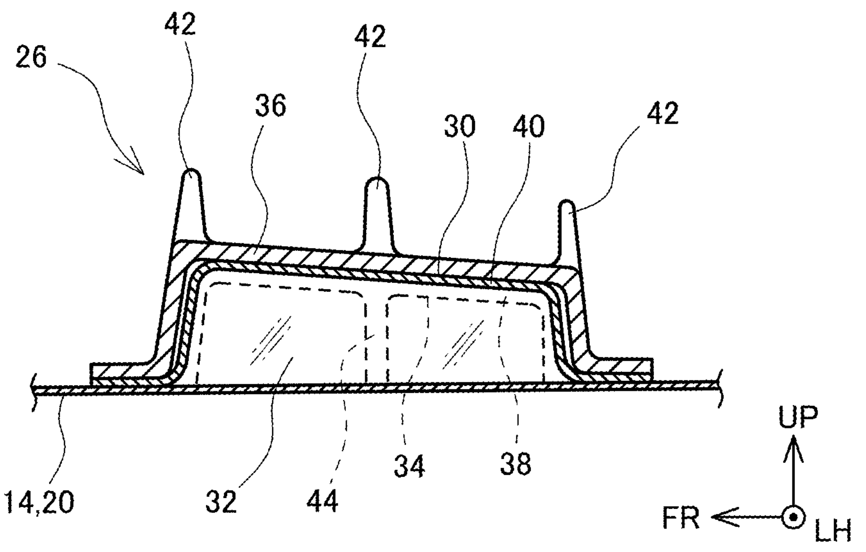
FIG. 5 shows a schematic cross sectional view of the cross member center component taken along line II-II indicated in FIG. 2.
Figure 6:
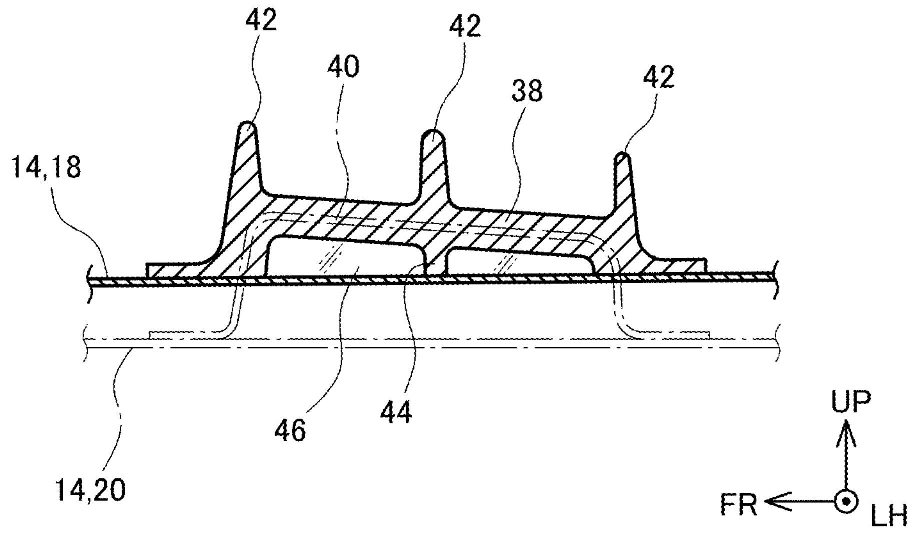
FIG. 6 shows a schematic cross sectional view of the cross member center component taken along line III-III indicated in FIG. 2.

FIGS. 2 to 4 are schematic diagrams showing the cross member center component 26. Specifically, FIG. 2 shows a plan view of the cross member center component 26, FIG. 3 shows a cross sectional view taken along line I-I indicated in FIG. 2, and FIG. 4 shows a bottom view. FIG. 5 shows a cross sectional view of the cross member center component 26 taken along line II-II indicated in FIGS. 2 to 4, and also shows a cross sectional view of the cross member side component 30 in addition to the cross member center component 26. FIG. 6 shows a cross sectional view of the cross member center component 26 taken along line III-III indicated in FIGS. 2 to 4, in which the main surface 20 of the floor panel 14 and the cross member side component 30 are also shown to indicate a relative positional relationship.

End walls 32 are arranged at positions spaced from the recess 28 on left and right sides of the recess 28 formed in the undersurface of the cross member center component 26. The end walls 32 are positioned so as to intersect the lateral direction. An end of the cross member side component 30 abuts against a laterally outer surface of the end wall 32. The laterally outer surface of the end wall 32 abutted by the cross member side component 30 is referred to as a contact surface 32*a*. The cross member center component 26 has an overlapping portion 36 which extends outward in the lateral direction from the end wall 32 and is overlaid on an end region of the cross member side component 30. A portion of the cross member center component 26 other than the overlapping portion 36; i.e., a portion of the cross member center component 26 that extends between the end walls 32, is referred to as a center component main body 34. Both of the center component main body 34 and the overlapping portion 36 have the top hat cross sectional shape as shown in FIGS. 5 and 6. The cross member center component 26 is joined to the floor panel 14 in such a manner that a flange being a lower rim of the top hat shape of the cross member center component 26 is attached to both the main surface 20 and the tunnel portion 18 of the floor panel 14 by a welding or bonding technique, for example.

As shown in FIG. 1, a base plate 38 constituting a top part of the top hat shape of the center component main body 34 and an upper plate 40 constituting a top part of the top hat shape of the cross member side component 30 are placed at the same height position, and the end of the upper plate 40 is brought into contact with an end surface of the base plate 38 that constitutes a part of the contact surface 32*a*. In this way, the upper surface of the floor cross member 24 extends straight over the entire length in the lateral direction. Because the upper surface of the floor cross member 24 extends straight, a collision load exerted from one side of the vehicle is efficiently transferred to one of the rockers 12 that is located opposite from the collided side. As a result, deformation of the other of the rockers 12 that is located on the collided side can be suppressed, which can, in turn, protect the battery pack 16.

FIG. 5 shows a cross section of the overlapping portion 36 of the cross member center component 26 and a cross section of the cross member side component 30 in a region adjacent to the end wall 32 of the center component main body 34. An outer contour line of the top hat cross sectional shape of the center component main body 34 coincides with an outer contour line of the top had cross sectional shape of the overlapping portion 36, and an inner contour line of the center component main body 34 indicated by a dotted line in FIG. is located inward from the overlapping portion 36. That is, in the cross member center component 26, the center component main body 34 has a greater plate thickness than a plate thickness of the overlapping portion 36. An inner surface of the overlapping portion 36 is designed to conform to an outer surface of the cross member side component 30. The cross member center component 26 is joined in the overlapping portion 36 to the cross member side component 30 by a bonding or welding technique, for example. The cross member side component 30 is brought into contact, as shown in FIG. 1, with the contact surface 32*a* of the end wall 32 of the cross member center component 26. Further, as shown in FIG. 5, an end surface of the cross member side component 30 is located within a range of the plate thickness of the center component main body 34 of the cross member center component 26. In other words, when the floor cross member 24 is viewed from the lateral outside, the end surface of the cross member side component 30 having the top hat shape is situated inside the top hat cross section of the center component main body 34 so as to overlap with the top hat shape of the center component main body 34. The entire end surface of the cross member side component 30 having the top hat shape is in contact with the contact surface 32*a*. Because the cross sectional shape of the cross member side component 30 overlaps with the cross sectional shape of the center component main body 34, the collision load exerted from the lateral outside is transferred through the entire cross sections of the top hat shape of both the cross member side component 30 and the center component main body 34, which can ensure reliable transfer of the collision load between the cross member side component 30 and the cross member center component 26.

Three upper ribs 42 extending in parallel along the lateral direction are disposed on the upper surface of the cross member center component 26, in particular, on the base plate 38 of the center component main body 34. FIG. 3 shows the entire shape of only a middle one of the three upper ribs 42. The length of any of the upper ribs 42; i.e., its lateral dimension, is greater than lateral dimensions of the tunnel portion 18 and the recess 28. In particular, the lateral dimension of the upper ribs 42 may be equal to a lateral dimension of the center component main body 34. The number of the upper ribs 42 may not necessarily be three, and more or fewer upper ribs 42 may be provided. Two of the three upper ribs 42 may coincide with a front end and a rear end of the base plate 38, respectively, in the center component main body 34, and the remaining one of the three upper ribs 42 may be placed at the center of the base plate 38. The upper ribs 42 can compensate for a decrease in strength of the cross member center component 26 that is caused by formation of the recess 28 on the undersurface of the cross member center component 26.

Lower ribs 44, 46, 48 are disposed on the cross member center component 26, in particular, on the undersurface of the base plate 38 in the center component main body 34. The lower rib 44 extends along the lateral direction, the lower rib 46 extends along the longitudinal direction, and the lower rib 48 extends diagonally with respect to the lateral or longitudinal direction. The lower ribs 44, 46, and 48 are positioned in a space bordered in its three directions by the cross member center component 26 having the top hat cross sectional shape, and lower ends of the lower ribs 44, 46, and 48 cooperate with the undersurface of the center component main body 34 to define the recess 28 which has the shape conforming to the tunnel portion 18. As shown in FIG. 3, the lower rib 44 extending along the lateral direction is increased in a vertical dimension in a region close to the end wall 32, and is connected to the end wall 32. A portion of the lower rib 44 that is connected to the end wall 32 has a vertical dimension equal to a vertical dimension of the end wall 32. The diagonally extending lower rib 48 also has a vertical dimension which is increased in a region close to the end wall 32, as in the case of the lower rib 44. That is, both of the lower ribs 44 and 48 intersecting the longitudinal direction of the vehicle have heights which are increased in a region facing the side wall 18*b* of the tunnel portion 18, to reinforce the floor cross member 24 in a region where the vertical dimension of the floor cross member 24 changes.

The overlapping portion 36 of the cross member center component 26 may be fixed to an end region of the cross member side component 30 that is overlaid by the overlapping portion 36 as shown in FIG. 1 using both a welding nut 50 (hereinafter referred to as a nut 50) welded to the cross member side component 30 and a bolt 52 designed to be screwed into the nut 50. In addition, the nut 50 and the bolt 52 are also used to fix a leg of a seat to both the overlapping portion 36 and the cross member side component 30. Specifically, the leg of the seat may be an under rail 54 for a seat track. The seat track includes the under rail 54 fixed to the floor 10, and an upper rail (not-illustrated in FIG. 1) configured to be slidable on the under rail 54. The seat is fixed to the upper rail, and is accordingly configured to be slidable in conjunction with the upper rail relative to the floor 10. FIG. 1 shows the under rail 54 located only on the left side, while an under rail on the right side is similarly fastened to both the cross member side component 30 and the overlapping portion 36 of the cross member center component 26. Because the leg of the seat is fastened to a part of the cast having a greater thickness than a thickness of the steel plate, fixation rigidity of the seat can be enhanced.

In addition, the strength of the floor cross member 24 can be enhanced by using the aluminum alloy cast, which has the greater thickness than the thickness of the steel plate and has a high degree of shaping flexibility, for the floor cross member 24 in a region where the floor cross member 24 traverses the tunnel portion 18. Meanwhile, the upper surface of the floor cross member 24 extending straight between the left and right rockers 12 can be maintained at a lower position, and the height of the cross member side component 30 can be maintained lower. In this way, foot space for a vehicle occupant can be sufficiently secured in a region on both left and right sides of the tunnel portion 18.

The embodiment has been explained in connection with the electrically driven vehicle in which the battery pack 16 which supplies electricity to the motor for driving the vehicle is mounted below the floor 10, although the floor structure described above may be applied to a floor structure of a vehicle which is driven by an engine.

The invention claimed is:

1. A vehicle floor structure, comprising, a floor panel integrally including a raised tunnel portion extending along the longitudinal direction of a vehicle; and a floor cross member extending along the lateral direction of the vehicle so as to traverse the tunnel portion, and being joined at both ends to left and right rockers extending along the left and right edges of the floor panel, and further joined to an upper surface of the floor panel, wherein the floor cross member comprises both a cross member center component and left and right cross member side components, the cross member center component is placed along an outer surface of the tunnel portion on the upper surface of the floor panel, at a first location along the longitudinal direction, so as to extend across the tunnel portion, and is made of an aluminum alloy cast with a recess formed in an undersurface of the cross member center component to accommodate the tunnel portion, each of the left and right cross member side components is made of a steel plate and is joined to a corresponding one of left and right ends of the cross member center component at a position located outside the tunnel portion in the lateral direction of the vehicle, and at the first location in the longitudinal direction, the cross member center component comprises a base plate disposed at the same height as an upper plate of each of the left and right cross member side components, each of the upper plates extending straight along the lateral direction of the vehicle, with an end of each of the upper plates abutting against a corresponding one of contact surfaces disposed at both lateral ends of the base plate, each of the cross member side components has a top hat cross sectional shape, the cross member center component has, in left and right end regions thereof, a top hat cross sectional shape; and the top hat cross sectional shape of each of the cross member side components overlaps the top hat cross sectional shape of the cross member center component when the floor cross member is viewed along the lateral direction.

2. The vehicle floor structure according to claim 1, wherein the cross member center component comprises a plurality of lower ribs disposed on the undersurface in a region facing a side wall of the tunnel portion, the plurality of lower ribs extending so as to intersect the longitudinal direction of the vehicle.

3. A vehicle floor structure, comprising:

a floor panel integrally including a raised tunnel portion extending along the longitudinal direction of a vehicle; and a floor cross member extending along the lateral direction of the vehicle so as to traverse the tunnel portion, and being joined at both ends to left and right rockers extending along the left and right edges of the floor panel, and further joined to an upper surface of the floor panel, wherein the floor cross member comprises both a cross member center component and left and right cross member side components, the cross member center component is placed along an outer surface of the tunnel portion on the upper surface of the floor panel, at a first location along the longitudinal direction, so as to extend across the tunnel portion, and is made of an aluminum alloy cast with a recess formed in an undersurface of the cross member center component to accommodate the tunnel portion, each of the left and right cross member side components is made of a steel plate and is joined to a corresponding one of left and right ends of the cross member center component at a position located outside the tunnel portion in the lateral direction of the vehicle, and at the first location in the longitudinal direction, the cross member center component comprises a base plate disposed at the same height as an upper plate of each of the left and right cross member side components, each of the upper plates extending straight along the lateral direction of the vehicle, with an end of each of the upper plates abutting against a corresponding one of contact surfaces disposed at both lateral ends of the base plate, and the cross member center component comprises, on an upper surface thereof, a plurality of upper ribs extending so as to intersect the longitudinal direction of the vehicle.

4. A vehicle floor structure, comprising:

a floor panel integrally including a raised tunnel portion extending along the longitudinal direction of a vehicle; and a floor cross member extending along the lateral direction of the vehicle so as to traverse the tunnel portion, and being joined at both ends to left and right rockers extending along the left and right edges of the floor panel, and further joined to an upper surface of the floor panel, wherein the floor cross member comprises both a cross member center component and left and right cross member side components, the cross member center component is placed along an outer surface of the tunnel portion on the upper surface of the floor panel so as to extend across the tunnel portion, and is made of an aluminum alloy cast with a recess formed in an undersurface of the cross member center component to accommodate the tunnel portion, each of the left and right cross member side components, is made of a steel plate and is joined to a corresponding one of left and right ends of the cross member center component at a position located outside the tunnel portion in the lateral direction of the vehicle, the cross member center component comprises a base plate disposed at the same height as an upper plate of each of the left and right cross member side components, each of the upper plates extending straight along the lateral direction of the vehicle, with an end of each of the upper plates abutting against a corresponding one of contact surfaces disposed at both lateral ends of the base plate, the cross member center component comprises an overlapping portion extending from the contact surface toward a lateral outside of the vehicle, the overlapping portion designed to be overlaid on a part of the cross member side component, and
in the overlapping portion, the cross member center component and the cross member side component are fastened along with a leg of a seat in the vehicle by a common bolt.

* * * * *